United States Patent
Kuwabara et al.

(10) Patent No.: US 8,824,170 B2
(45) Date of Patent: Sep. 2, 2014

(54) POWER FACTOR CORRECT CURRENT RESONANCE CONVERTER

(75) Inventors: Koji Kuwabara, Yokohama (JP); Tadahiko Sato, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 439 days.

(21) Appl. No.: 13/232,538

(22) Filed: Sep. 14, 2011

(65) Prior Publication Data

US 2012/0063174 A1 Mar. 15, 2012

(30) Foreign Application Priority Data

Sep. 15, 2010 (JP) ................. 2010-206396

(51) Int. Cl.
*H02M 3/335* (2006.01)
*H02M 3/337* (2006.01)
*H02M 1/42* (2007.01)

(52) U.S. Cl.
CPC .......... *H02M 1/4225* (2013.01); *H02M 3/3376* (2013.01); *Y02B 70/1433* (2013.01); *Y02B 70/126* (2013.01)
USPC ......................... 363/21.02; 363/21.08; 363/89

(58) Field of Classification Search
USPC ............................. 363/21.02, 21.08, 21.16, 89
See application file for complete search history.

(56) References Cited

U.S. PATENT DOCUMENTS

| 6,980,446 | B2* | 12/2005 | Simada et al. ................... 363/49 |
| 8,207,680 | B2* | 6/2012 | Nakada et al. ................ 315/291 |
| 8,427,853 | B2* | 4/2013 | Uno ............................... 363/125 |
| 8,630,101 | B2* | 1/2014 | Young et al. ..................... 363/17 |
| 2003/0063479 | A1* | 4/2003 | Morita et al. .................. 363/37 |
| 2011/0085354 | A1* | 4/2011 | Wang et al. ................. 363/21.02 |
| 2011/0309759 | A1* | 12/2011 | Shteynberg et al. .......... 315/201 |
| 2012/0063174 | A1* | 3/2012 | Kuwabara et al. .......... 363/21.02 |
| 2013/0083564 | A1* | 4/2013 | Bai et al. .................... 363/21.02 |
| 2013/0285621 | A1* | 10/2013 | Cho et al. ....................... 320/162 |
| 2014/0009970 | A1* | 1/2014 | Brinlee et al. ............. 363/21.01 |

FOREIGN PATENT DOCUMENTS

| JP | 05-199753 A | 8/1993 |
| JP | 2006-204048 A | 8/2006 |
| JP | 2007-097303 A | 4/2007 |

* cited by examiner

*Primary Examiner* — Jeffrey Sterrett
(74) *Attorney, Agent, or Firm* — Rabin & Berdo, P.C.

(57) ABSTRACT

A power factor correct current resonance converter is disclosed which eliminates interference of switching operations between two cascade-connected converter circuits. The power factor correct current resonance converter includes a current resonance converter circuit having switches, a resonance capacitor, a resonance inductor, a transformer, diodes, a smoothing capacitor, and a control circuit. The power factor correct current resonance converter also includes a power factor correct converter circuit having a choke coil, a diode, a smoothing capacitor, and a switch. The switch is turned on or off in response to a voltage produced in a winding of the transformer. Thus, the switching operation of the power factor correct converter circuit is performed in synchronization with the switching operation of the current resonance converter circuit, so that interference of the switching operations is eliminated. In addition, since a dedicated control circuit is not required, the cost can be reduced.

7 Claims, 13 Drawing Sheets

POWER FACTOR CORRECT CURRENT RESONANCE CONVERTER

CROSS-REFERENCE TO RELATED APPLICATION

This application claims the benefit of priority of Japanese patent application number 2010-206396, filed on Sep. 15, 2010, the disclosure of which is incorporated herein by reference.

BACKGROUND OF THE INVENTION

1. Field of the Invention

The present invention relates to a power factor correct current resonance converter, and more particularly, to a power factor correct current resonance converter formed by cascade-connecting a PFC (Power Factor Correct) converter circuit to a current resonance converter circuit.

2. Background Art

A DC-DC converter is a power source apparatus that steps up or down a direct-current input voltage to provide a certain direct-current output voltage. A resonance (or resonant) converter circuit is known as a type of the DC-DC converter. The resonance converter circuit has the property of being capable of providing favorable output load characteristics when the direct-current input voltage is not changed. Thus, in using a commercial alternating-current power source as an input power source for the resonance converter circuit, a power factor correct converter circuit is placed in the previous stage to stabilize the input voltage in a commonly used configuration (See, for example, Patent Documents 1 and 2). A specific configuration example of such a DC-DC converter of two-stage configuration is shown below.

Figure 13:
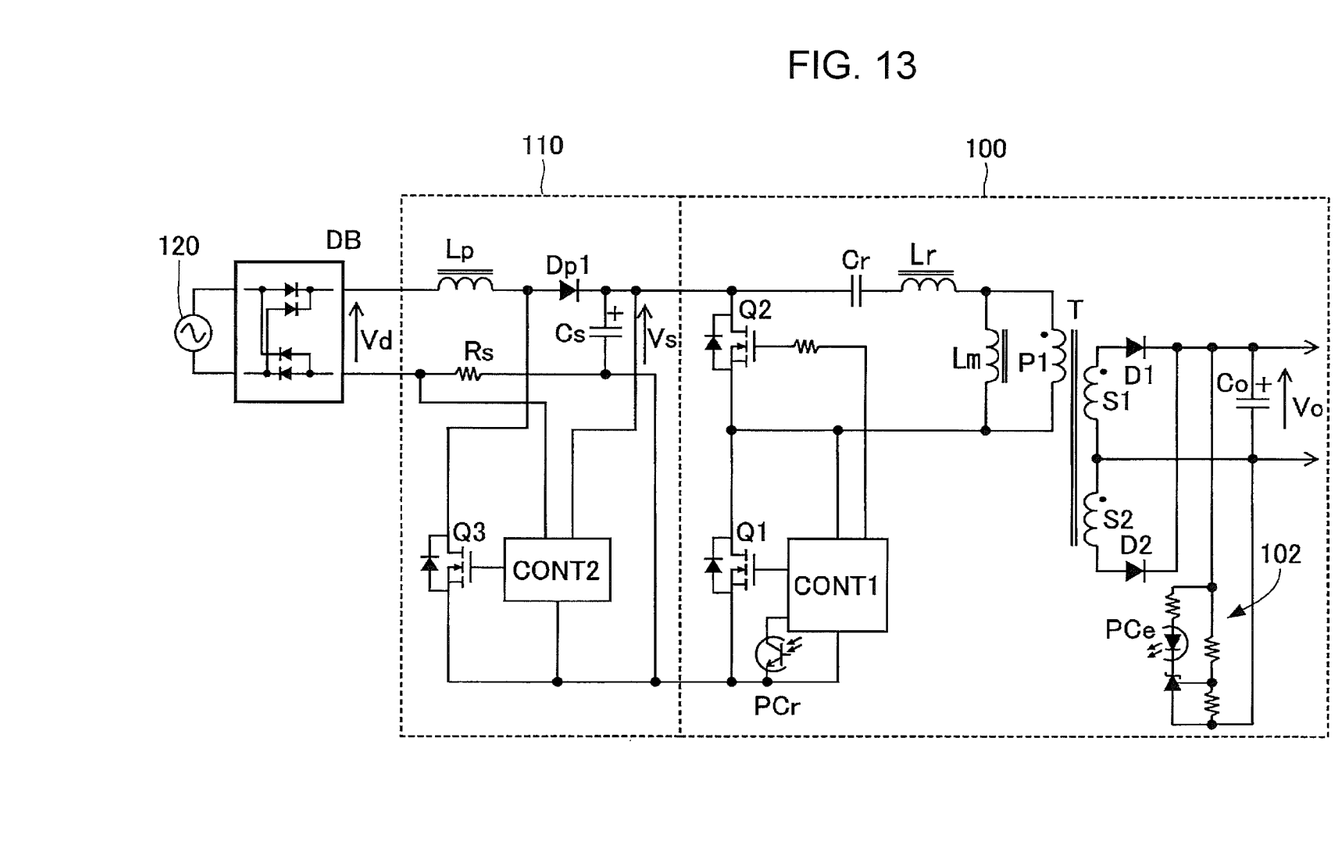
FIG. 13 is a circuit diagram showing an example of a conventional DC-DC converter.

FIG. 13 is a circuit diagram showing an example of a conventional DC-DC converter.

The DC-DC converter includes a current resonance converter circuit 100 which receives a direct-current voltage Vs and outputs a direct-current voltage Vo and a power factor correct converter circuit 110 which outputs the direct-current voltage Vs from a voltage Vd provided by rectifying a commercial alternating-current power source 120 with a diode bridge DB.

In the current resonance converter circuit 100, a series circuit including two switches Q1 and Q2 is connected in parallel to the direct-current voltage Vs, and a control circuit CONT1 is connected to each of the gates of the switches Q1 and Q2. The current resonance converter circuit 100 also includes a resonance capacitor Cr and a resonance inductor Lr connected in series, and the resonance inductor Lr is connected to a winding P1 on a primary side of a transformer T. An equivalent circuit of the winding P1 of the transformer T is connected in parallel to an exciting inductance Lm. Windings S1 and S2 on a secondary side of the transformer T are connected to a rectifying/smoothing circuit which is formed of diodes D1 and D2 and a smoothing capacitor Co to output the voltage Vo. The smoothing capacitor Co is connected in parallel to a feedback circuit 102. The feedback circuit 102 includes a photocoupler PCe (light-emitting diode) which emits light depending on variations in the voltage Vo at the output and a photocoupler PCr (phototransistor) which receives the emitted light such that the phototransistor of the photocoupler PCr on the light-receiving side is connected to the control circuit CONT1. The control circuit CONT1 controls the on-times or the switching frequencies of the two switches Q1 and Q2 based on the voltage Vo at the output to stabilize the voltage Vo at the output.

The power factor correct converter circuit 110 includes a choke coil Lp, a diode Dp1, a switch Q3, a smoothing capacitor Cs, a resistance Rs for current detection, and a control circuit CONT2. The control circuit CONT2 detects the voltage Vs across the smoothing capacitor Cs and detects a current passing through the choke coil Lp with the detection resistance Rs, controls the switch Q3 based on these detected values, and provides the input current of sinusoidal wave form to improve the power factor.

In the conventional DC-DC converter, the current resonance converter circuit 100 and the power factor correct converter circuit 110 include the control circuits CONT1 and CONT2, respectively, and the control circuits CONT1 and CONT2 operate independently. For this reason, the current resonance converter circuit 100 and the power factor correct converter circuit 110 employ different control methods and different switching frequencies.

SUMMARY OF THE INVENTION

Since the two converter circuits perform different operations individually in the conventional DC-DC converter of two-stage configuration, there has been a problem in which the switching operations interfere with each other to cause unstable operations.

The DC-DC converter of two-stage configuration operates at the different switching frequencies, so that a noise filter for reducing switching noise is disadvantageously complicated. In addition, since the two control circuits are needed, there has been a problem in which a number of parts are used to increase the cost.

The invention has been made in view of these problems, and it is an object thereof to provide a power factor correct current resonance converter in which the interference of switching operation is eliminated between two cascade-connected converter circuits and the cost can be reduced.

To solve the above-mentioned problems, in the invention, a power factor correct current resonance converter includes a current resonance converter circuit and a power factor correct converter circuit cascade-connected in the previous stage of the current resonance converter circuit, the power factor correct converter circuit has no dedicated control circuit which operates independently, and the switching operation of the power factor correct converter circuit is performed in synchronization with the switching operation of the current resonance converter circuit by using a voltage produced in the switching operation of the current resonance converter circuit.

The power factor correct current resonance converter of the above-mentioned configuration has the advantage in which one integrated operation frequency is used in the power factor correct current resonance converter since the switching operation of the power factor correct converter circuit is performed in synchronization with the switching operation of the current resonance converter circuit. This can stabilize the operation of the power factor correct current resonance converter and reduce the occurrence of noise to improve the performance of the power factor correct current resonance converter.

In addition, since the power factor correct converter circuit has no dedicated control circuit which operates independently in the power factor correct current resonance converter of the above-mentioned configuration, the cost of the power factor correct current resonance converter can be reduced.

DESCRIPTION OF THE PREFERRED EMBODIMENTS

Embodiments according to the invention will hereinafter be described in detail with reference to the drawings. In the drawings, circuit elements having the functions corresponding to those of the circuit elements shown in FIG. 13 are designated with the common reference numerals and signs.

Figure 1:
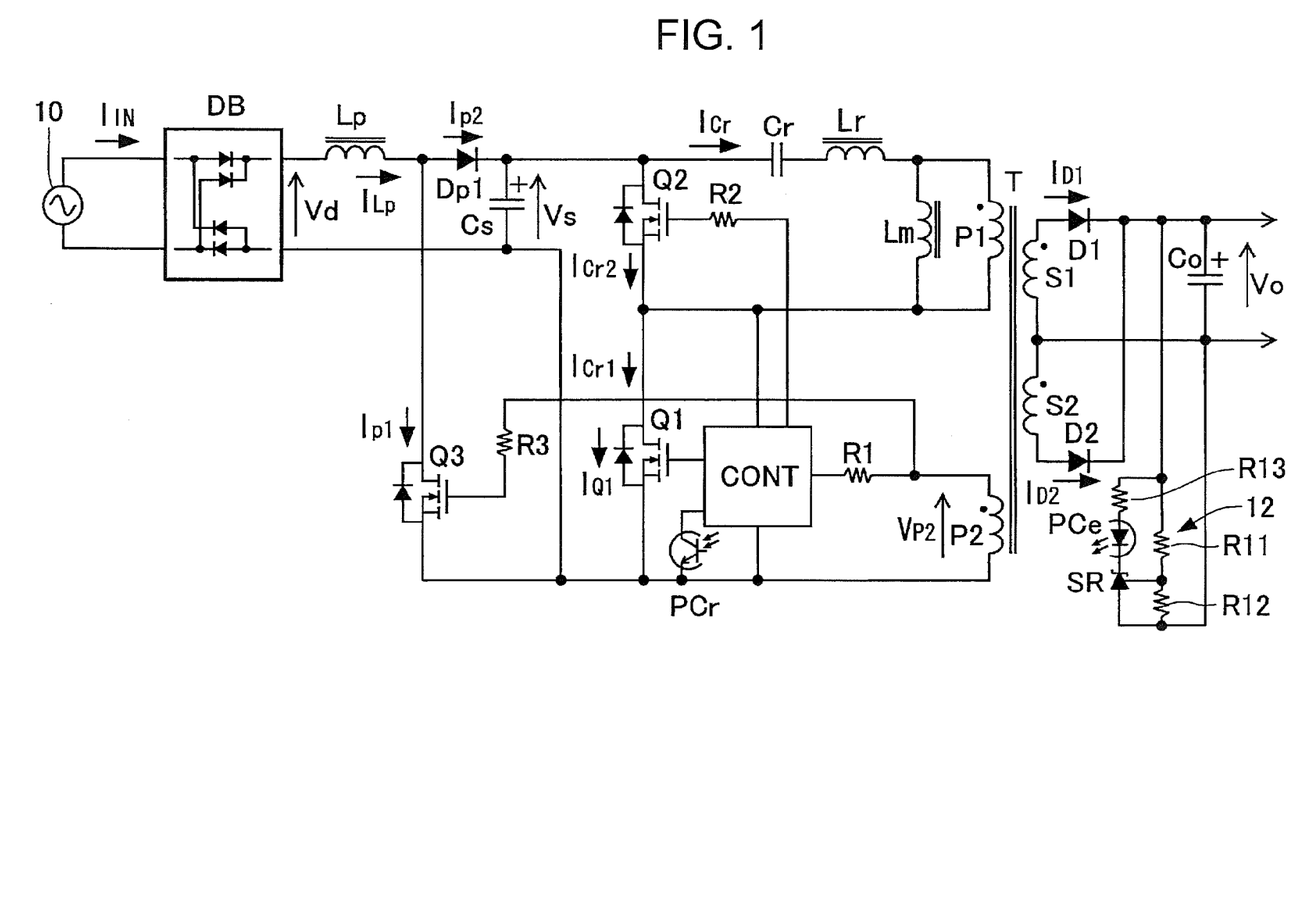
FIG. 1 is a circuit diagram showing a power factor correct current resonance converter according to Embodiment 1.
Figure 2:
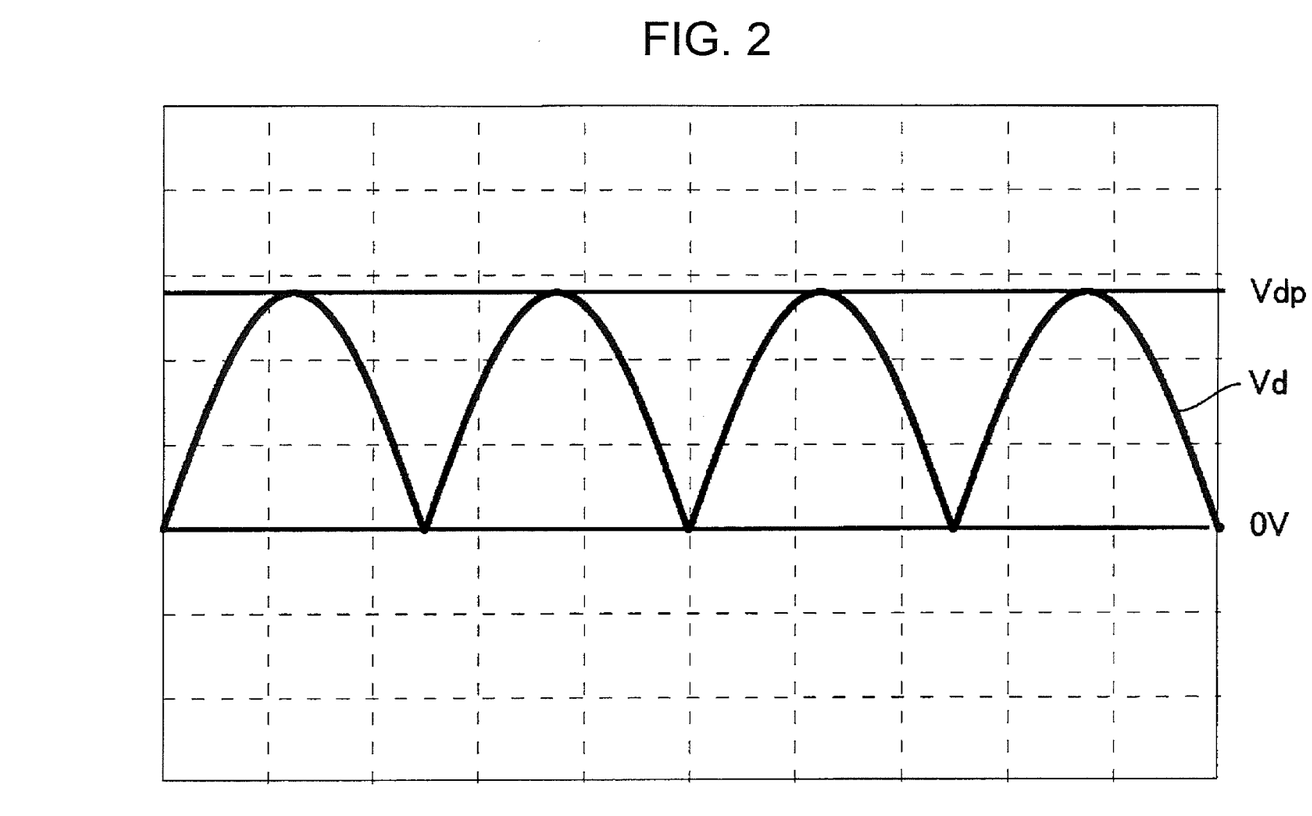
FIG. 2 is a graph showing an example of an output voltage waveform of a rectifying circuit.
Figure 3:
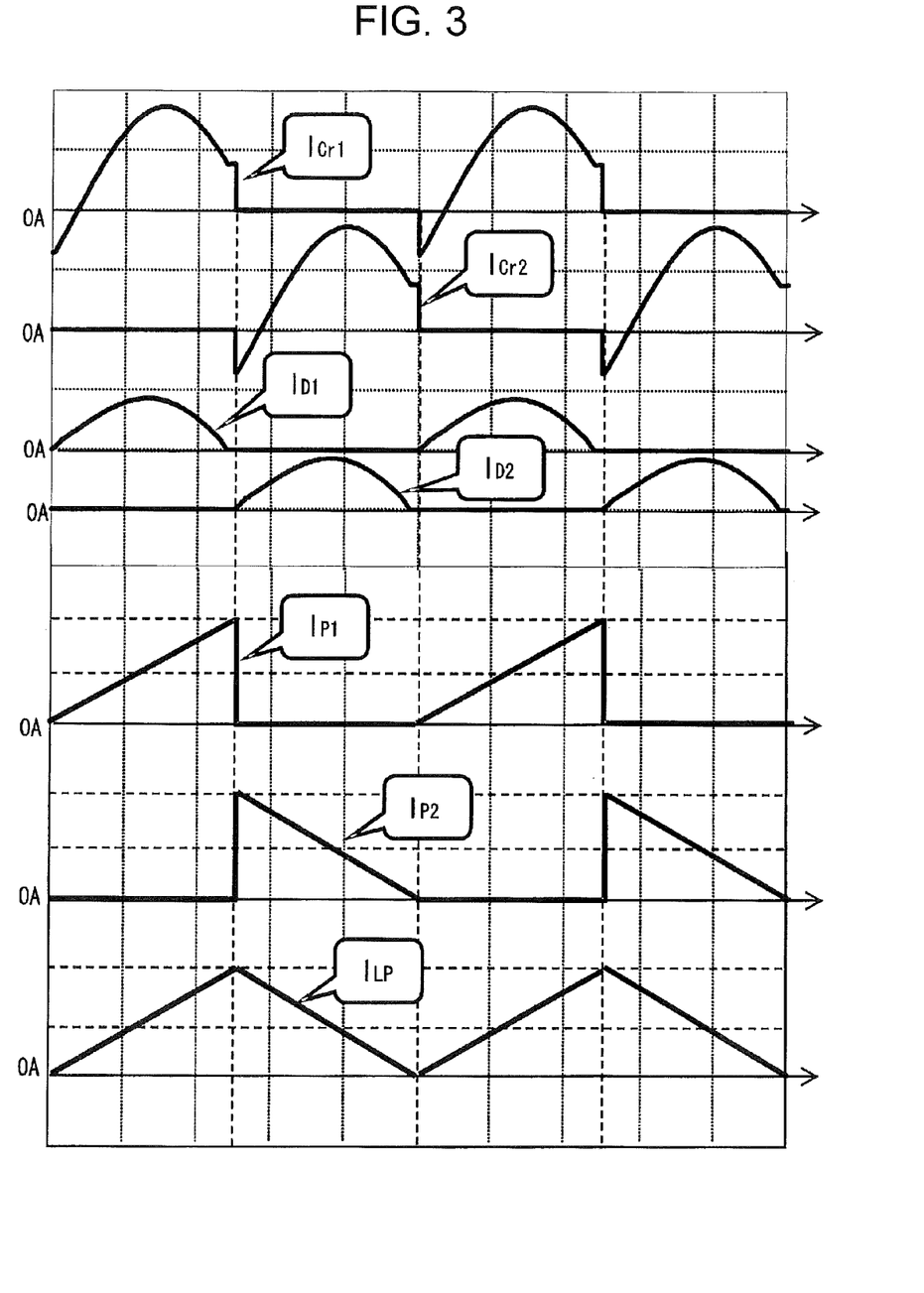
FIG. 3 is a graph showing an example of a current waveform in each portion of the power factor correct current resonance converter.
Figure 4:
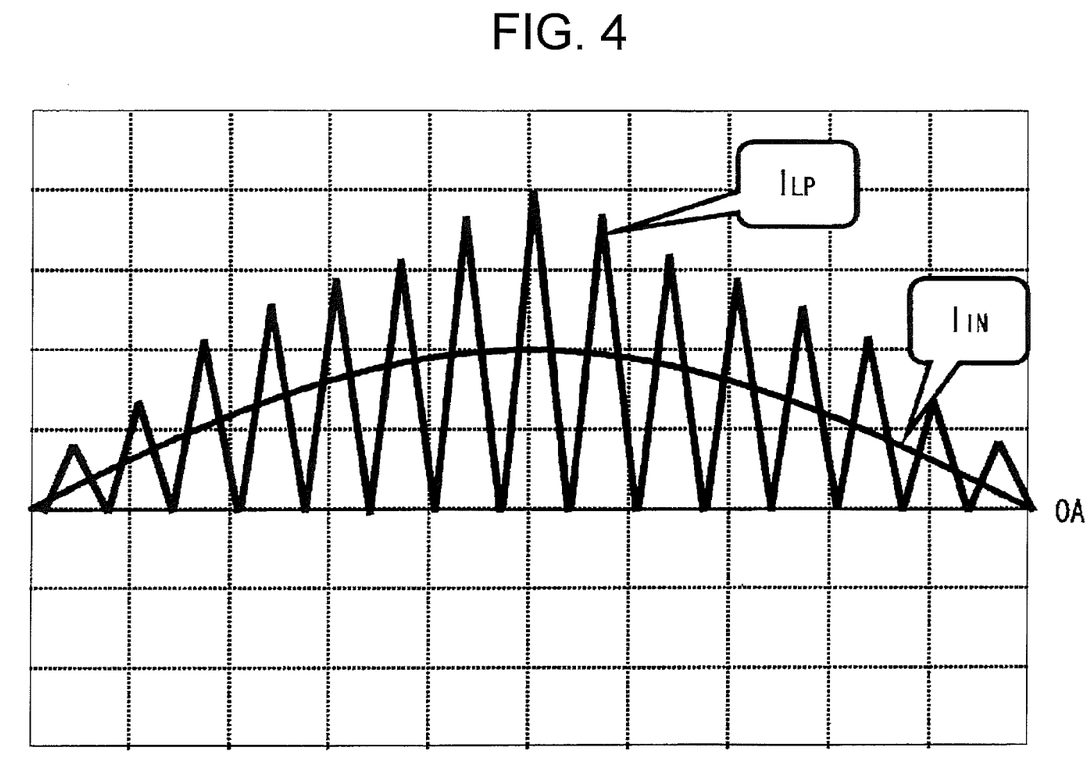
FIG. 4 is a graph of a waveform example showing a choke coil current and an input current.

FIG. 1 is a circuit diagram showing a power factor correct current resonance converter according to Embodiment 1, FIG. 2 is a graph showing an example of an output voltage waveform of a rectifying circuit, FIG. 3 is a graph showing an example of a current waveform in each portion of the power factor correct current resonance converter, and FIG. 4 is a graph of a waveform example showing a choke coil current and an input current.

The power factor correct current resonance converter according to Embodiment 1 has a configuration which includes a current resonance converter circuit and a power factor correct converter circuit such that the current resonance converter circuit and the power factor correct converter circuit are controlled by a single control circuit CONT. The power factor correct converter circuit receives a voltage Vd of pulsating flow provided by rectifying a commercial alternating-current power source 10 with a diode bridge DB and outputs a direct-current voltage Vs after voltage conversion, and the current resonance converter circuit receives the voltage Vs and outputs a direct-current voltage Vo.

In the current resonance converter circuit, two switches Q1 and Q2 in series connection are connected in parallel to the voltage Vs. In this embodiment, each of the switches Q1 and Q2 is implemented by using an N-channel power MOSFET (Metal-Oxide-Semiconductor Field Effect Transistor). Specifically, a terminal on a positive pole side of the voltage Vs is connected to a drain terminal of the switch Q2, a source terminal of the switch Q2 is connected to a drain terminal of the switch Q1, and a source terminal of the switch Q1 is connected to a terminal on a negative pole side of the voltage Vs.

The terminal on the positive pole side of the voltage Vs is also connected to one end of a resonance capacitor Cr, and the other end of the resonance capacitor Cr is connected to one end of a resonance inductor Lr. The other end of the resonance inductor Lr is connected to one end of a winding P1 on a primary side of a transformer T, and the other end of the winding P1 is connected to a common connection point of the switches Q1 and Q2. An equivalent circuit of the winding P1 of the transformer T is connected in parallel to an exciting inductance Lm at both ends of the winding P1. The transformer T also has a second winding P2 on the primary side, and one end thereof is connected to a control input terminal of the control circuit CONT through a resistance R1, and the other end is connected to a ground terminal of the control circuit CONT.

The transformer T has two windings S1 and S2 on a secondary side that are connected in series to each other. Anode terminals of diodes D1 and D2 are connected to terminals of the windings S1 and S2, respectively, and cathode terminals thereof are connected to each other for connection to a positive pole terminal of a smoothing capacitor Co. A negative pole terminal of the smoothing capacitor Co is connected to a connection point of the windings S1 and S2. The diodes D1 and D2 and the smoothing capacitor Co constitute a rectifying/smoothing circuit to output the direct-current voltage Vo. Dots shown at the windings P1, P2, S1, and S2 of the transformer T represent the polarity.

A feedback circuit 12 is connected to the smoothing capacitor Co. The feedback circuit 12 has resistances R11 and R12 in series connection that are connected between the positive pole terminal and the negative pole terminal of the smoothing capacitor Co to detect variations in the voltage Vo at the output. A series circuit formed of a resistance R13 for current limitation, a photocoupler PCe (light-emitting diode) on a light-emitting side, and a shunt regulator SR is connected in parallel to the series circuit including the resistances R11 and R12. A reference terminal of the shunt regulator SR is connected to a common connection portion to the resistance R11 and the resistance R12. On the other hand, a photocoupler PCr (phototransistor) on a light-receiving side forming a pair with the photocoupler PCe on the light-emitting side is connected between a feedback terminal of the control circuit CONT and a source terminal (ground terminal) of the switch Q1. The shunt regulator SR passes a current detected by the resistances R11 and R12 and depending on the variation in the voltage Vo relative to a reference voltage of the shunt regulator SR, not shown, to the photocoupler PCe on the light-emitting side, and the photocoupler PCr on the light-receiving side inputs an error signal corresponding to the variation to the feedback terminal of the control circuit CONT.

In the power factor correct converter circuit, a positive pole terminal of the voltage Vd output from the diode bridge DB is connected to one end of a choke coil Lp, and the other end of the choke coil Lp is connected to an anode terminal of a diode Dp1 and a switch Q3. In this embodiment, the switch Q3 is implemented by an N-channel power MOSFET, and a connection point of the choke coil Lp and the diode Dp1 is connected to a drain terminal of the switch Q3. A cathode terminal of the diode Dp1 is connected to a positive pole terminal of a smoothing capacitor Cs, and a negative pole terminal of the smoothing capacitor Cs is connected to a negative pole terminal of the diode bridge DB, a source terminal of the switch Q3, and a source terminal of the switch Q1 of the current resonance converter circuit, that is, a ground terminal.

The control circuit CONT has a first control output connected to a gate terminal of the switch Q1 and a second control output connected to a gate terminal of the switch Q2 through a resistance R2. A gate terminal of the switch Q3 is connected to one end of the second winding P2 provided on the primary side of the transformer T through a resistance R3.

In the power factor correct current resonance converter of the configuration described above, the control circuit CONT detects the voltage Vo at the output through the feedback circuit 12 (more strictly, detects an error voltage relative to the reference voltage of the output voltage Vo) in the current resonance converter circuit. The control circuit CONT controls the on-times or the switching frequencies of the two switches Q1 and Q2 based on the voltage Vo to stabilize the voltage Vo at the output. The control circuit CONT also receives the voltage produced at the second winding P2 provided on the primary side of the transformer T and detects the on or off state of the second switch Q2. Thus, since the switch Q1 is not turned on while the switch Q2 is turned on in the current resonance converter circuit, the two switches Q1 and Q2 are not turned on simultaneously.

In the power factor correct converter circuit, the choke coil Lp and the diode Dp1 for power factor correct are inserted between the diode bridge DB and the smoothing capacitor Cs, and the switch Q3 is driven by the voltage produced at the second winding P2 on the primary side of the transformer T. The circuit including the choke coil Lp, the diode Dp1, the smoothing capacitor Cs, and the switch Q3 is similar to the one in the step-up converter in FIG. 13. However, the on-off control of the switch Q3 is not optimized for the power factor correct converter circuit but is synchronized with the turn-on or turn-off of the switch Q1 in the current resonance converter circuit, so that the voltage Vs output to the smoothing capacitor Cs is not stabilized sufficiently.

As shown in FIG. 2, the voltage Vd input to the power factor correct converter circuit has a waveform provided by rectifying the commercial alternating-current power source 10 with the diode bridge DB. The commercial alternating-current power source 10 has a frequency of 50 Hz or 60 Hz and a cycle of 20 ms or 16.7 ms, and the frequency is significantly lower than the switching frequency (for example, 50 kHz to 100 kHz) of the current resonance converter circuit.

The current resonance converter circuit is a half-bridge switching circuit which receives the voltage Vs across the smoothing capacitor Cs as its input. The two, upper and lower, switches Q1 and Q2 are controlled to be turned on and off alternately.

When the switch Q1 on the lower side is turned on first, a current $I_{Cr}$ flows through the resonance capacitor Cr, the resonance inductor Lr, the first winding P1 on the primary side of the transformer T, and the switch Q1. At this point, since resonance occurs in an LC circuit formed of the resonance capacitor Cr and the resonance inductor Lr, a flowing current $I_{Cr1}$ is the sum of a current of sinusoidal wave form flowing to the secondary side through the first winding P1 (where P1 is a component of an ideal transformer) and an exciting current flowing through the exciting inductance Lm of the transformer T as shown in FIG. 3. The application of the input of the sinusoidal wave to the first winding P1 on the primary side induces a voltage in the winding S1 on the secondary side of the transformer T, and the voltage is rectified by the diode D1 and smoothed by the smoothing capacitor Co to provide the voltage Vo. The current flowing through the diode D1 at this point is a current $I_{D1}$ shown in FIG. 3. Since a voltage in the winding P1 is applied to and the exciting current flows through the exciting inductance Lm of the transformer T, a current $I_{Q1}$ provided by adding the exciting current to the resonance current flows through the switch Q1.

Next, when the switch Q1 is turned off and the switch Q2 on the upper side is turned on, a current $I_{Cr2}$ (a sinusoidal wave component thereof except the exciting current) flows in the route of the winding P1, the resonance inductor Lr, and the resonance capacitor Cr. This causes the voltage produced in the winding S2 on the secondary side of the transformer T to be rectified by the diode D2 and smoothed by the smoothing capacitor Co to provide the voltage Vo. At this point, a current flowing through the diode D2 is a current $I_{D2}$ shown in FIG. 3. The stabilization of the voltage Vo is performed by changing the switching frequencies of the switches Q1 and Q2.

The second winding P2 provided on the primary side of the transformer T is wound such that a voltage VP2 of positive pole is produced in the winding P2 while the switch Q1 on the lower side is turned on. Thus, when the switch Q1 is turned on, the switch Q3 is also turned on, and when the switch Q1 is turned off, the switch Q3 is also turned off.

When the switch Q3 is turned on, the voltage Vd rectified by the diode bridge DB is applied to the choke coil Lp connected between the diode bridge DB and the smoothing capacitor Cs, and a current $I_{P1}$ flows through the switch Q3 as shown in FIG. 3. This accumulates energy in the choke coil Lp. When the switch Q1 is turned off, the switch Q3 is also turned off to move the energy accumulated in the choke coil Lp up to that point to the smoothing capacitor Cs through the diode Dp1. At this point, a current $I_{P2}$ flows through the diode Dpi as shown in FIG. 3. A current flowing through the choke coil Lp when the switch Q3 is turned on and off is shown by a current $I_{LP}$ in FIGS. 1, 3, and 4.

The on-time of the switch Q3 is equal to the on-time of the switch Q1. Assuming that the on-time of the switch Q3 is T1 and the off-time of the switch Q3 is T2, the voltage Vs across the smoothing capacitor Cs is represented as an expression (1):

$$Vs = Vd/(1-D) \tag{1}$$

$$D = T1/(T1+T2) = 0.5 \tag{2}$$

$$Vs = 2Vdp \tag{3}$$

where D represents the time ratio, and when the on-times of the switch Q1 and the switch Q2 are equal to each other, D is 0.5 as shown in the expression (2). When the smoothing capacitor Cs has a high capacitance value, the voltage variations of the voltage Vs for the cycle of the commercial alternating-current are extremely small, so that the voltage Vs in this case has a value substantially equal to twice the maximum voltage Vdp of the rectified voltage Vd as shown in the expression (3).

Since the switch Q3 is driven over the time equal to the on-time of the switch Q1 on the lower side in the current resonance converter circuit, as shown in FIG. 4 the current $I_{LP}$ of the frequency equal to the switching frequency of the current resonance converter circuit flows through the choke coil Lp. At this point, the average value or the peak waveform of the current $I_{LP}$ flowing through the choke coil Lp has an almost sinusoidal wave and the power factor is improved. Specifically, if the load does not vary, the switching frequency of the current resonance converter circuit and the above-mentioned on-time T1 are constant, and the peak current of the current flowing through the choke coil Lp is proportional to the voltage across the choke coil Lp while the switch element Q3 is turned on, that is, the output voltage of the diode bridge DB. Since an input current $I_{IN}$ input from the commercial alternating-current power source 10 has a waveform obtained from averaging the current $I_{LP}$ flowing through the choke coil Lp by a filter circuit, not shown, the result is an almost sinusoidal wave as shown in FIG. 4.

According to the power factor correct current resonance converter of the above-mentioned configuration, the power factor correct converter circuit is not operated independently but is caused to function as a power factor correct circuit controlled by the control circuit CONT in the current resonance converter circuit. Since the switch in the power factor correct circuit is turned on or off in synchronization with the switching of the current resonance converter circuit, no control circuit is needed in the power factor correct converter circuit to allow a reduction in cost of the converter. In addition, since one integrated operation frequency is used in the converter, the operation of the converter is stabilized and the occurrence of noise is reduced to improve the performance of the converter.

Figure 5:
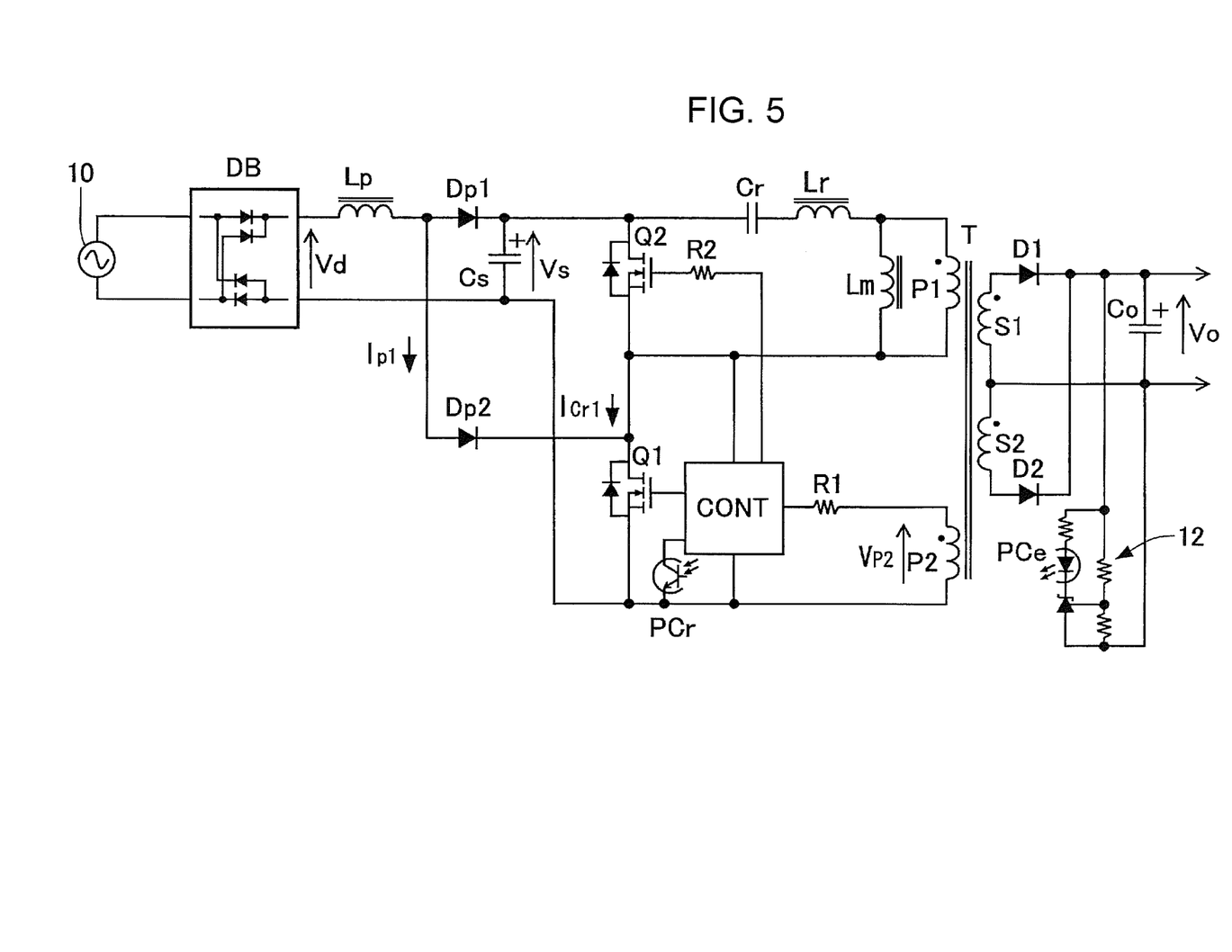
FIG. 5 is a circuit diagram showing a power factor correct current resonance converter according to Embodiment 2.

FIG. 5 is a circuit diagram showing a power factor correct current resonance converter according to Embodiment 2. In FIG. 5, components identical to or equivalent to the components shown in FIG. 1 are designated with the same reference numerals and signs, and detailed description thereof is omitted.

In the power factor correct current resonance converter according to Embodiment 2, a switch Q1 on a lower side in a current resonance converter circuit doubles as the third switch Q3 included in the power factor correct current resonance converter according to Embodiment 1.

Specifically, in the power factor correct current resonance converter, a connection point of a choke coil Lp and a diode Dp1 is connected to a drain terminal of the switch Q1 in the current resonance converter circuit through a diode Dp2. The remaining configuration is not different from that in Embodiment 1. This causes the power factor correct converter circuit to be turned on or off in synchronization with the turn-on or turn-off of the switch Q1 in the current resonance converter circuit. Thus, the power factor correct current resonance converter performs the same operation as that of the power factor correct current resonance converter according to Embodiment 1.

The diode Dp2 is provided for preventing a backflow of current. Since the switch Q1 doubles as the switch for operating the power factor correct converter circuit and the current flowing through the switch Q1 is the sum of a current $I_{P1}$ and a current $I_{Cr1}$, the flowing current is larger than that through a switch Q2 on an upper side.

Figure 6:
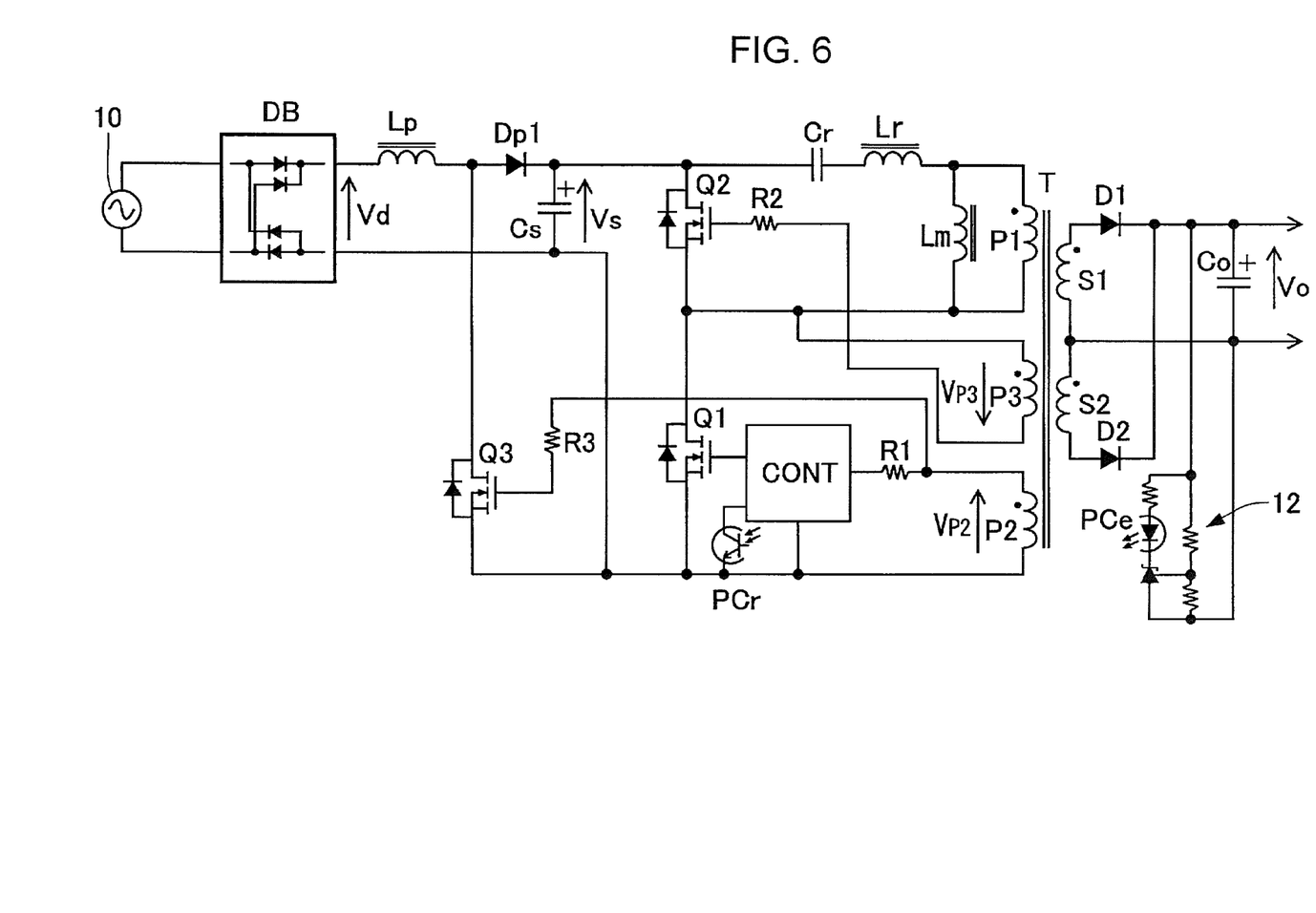
FIG. 6 is a circuit diagram showing a power factor correct current resonance converter according to Embodiment 3.

FIG. 6 is a circuit diagram showing a power factor correct current resonance converter according to Embodiment 3. In FIG. 6, components identical to or equivalent to the components shown in FIG. 1 are designated with the same reference numerals and signs, and detailed description thereof is omitted.

In the power factor correct current resonance converter according to Embodiment 3, a switch Q2 in a current resonance converter circuit is not driven by a control circuit CONT but driven by a voltage VP3 produced in a third winding P3 provided on a primary side of a transformer T. The winding P3 is wound such that the voltage VP3 of positive pole is produced while a switch Q1 on a lower side is turned off. Thus, in the power factor correct current resonance converter, the control circuit CONT does not drive the switch Q2. The remaining configuration is the same as that in Embodiment 1. Therefore, the power factor correct current resonance converter performs the same operation as that of the power factor correct current resonance converter according to Embodiment 1.

Figure 7:
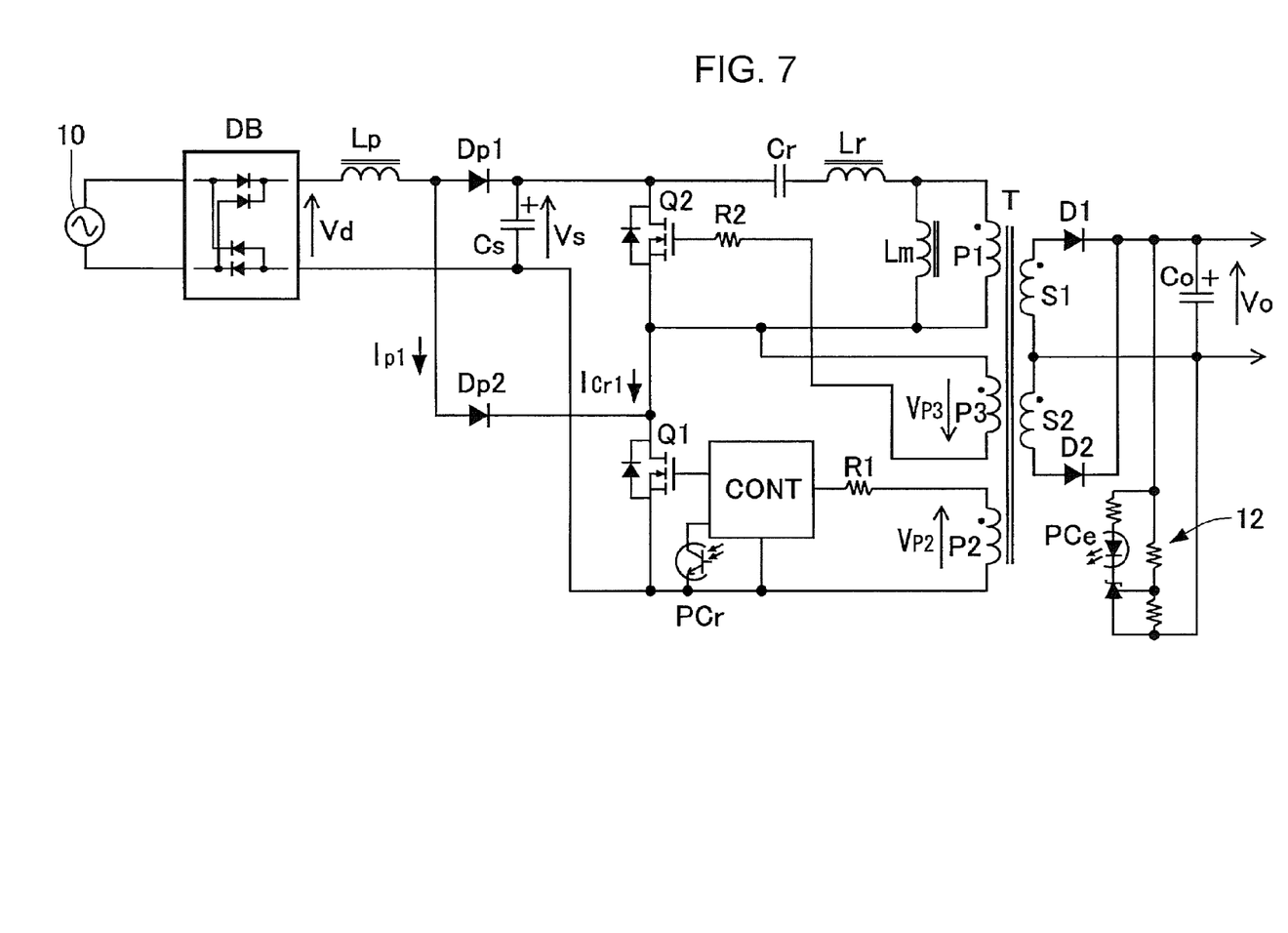
FIG. 7 is a circuit diagram showing a power factor correct current resonance converter according to Embodiment 4.

FIG. 7 is a circuit diagram showing a power factor correct current resonance converter according to Embodiment 4. In FIG. 7, components identical to or equivalent to the components shown in FIG. 5 and FIG. 6 are designated with the same reference numerals and signs, and detailed description thereof is omitted.

The power factor correct current resonance converter according to Embodiment 4 has a configuration of a combination of the power factor correct current resonance converter according to Embodiment 2 and the power factor correct current resonance converter according to Embodiment 3.

Specifically, a third winding P3 is provided on a primary side of a transformer T, and a switch Q2 on an upper side is driven by a voltage VP3 produced in the winding. A connection point of a choke coil Lp and a diode Dp1 is connected to a drain terminal of a switch Q1 in a current resonance converter circuit through a diode Dp2. The switch Q1 simultaneously performs the switching operations of the power factor correct converter circuit and the current resonance converter circuit. The remaining configuration is the same as that in Embodiment 1. Therefore, the power factor correct current resonance converter performs the same operation as that of the power factor correct current resonance converter according to Embodiment 1.

Figure 8:
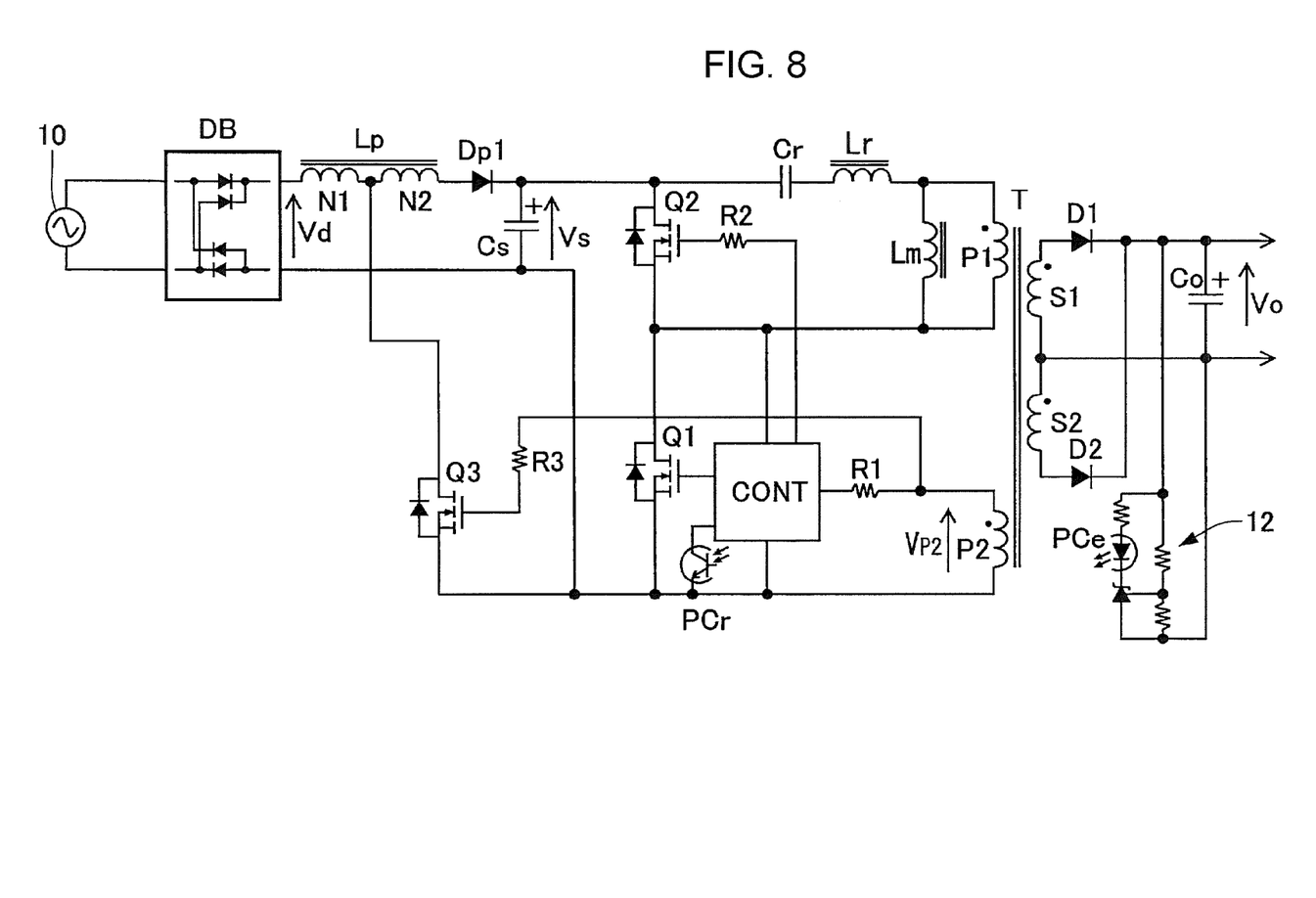
FIG. 8 is a circuit diagram showing a power factor correct current resonance converter according to Embodiment 5.

FIG. 8 is a circuit diagram showing a power factor correct current resonance converter according to Embodiment 5. In FIG. 8, components identical to or equivalent to the components shown in FIG. 1 are designated with the same reference numerals and signs, and detailed description thereof is omitted.

In the power factor correct current resonance converter according to Embodiment 5, the configuration of the choke coil Lp in the power factor correct converter circuit of the power factor correct current resonance converter according to Embodiment 1 is changed. Specifically, the choke coil Lp has a winding provided with a tap. Thus, the winding of the choke coil Lp is not one but is formed of two windings N1 and N2 to adjust the step-up ratio of a voltage produced in a smoothing capacitor Cs. In the power factor correct current resonance converter shown, a connection point of the winding N1 and the wining N2 is connected to a switch Q3. In this case, a voltage Vs produced in the smoothing capacitor Cs is represented as in an expression (4) and an expression (5):

$$Vs=Vd\{1-(1-m)D\}/(1-D) \quad (4)$$

$$m=(N1+N2)/N1 \quad (5)$$

Assuming that N1=N2 and the time ratio D=0.5 by way of example, m in the expression (5) is equal to two, the voltage Vs in the expression (4) is equal to 3 Vd, and the step-up ratio is higher than that of the expression (3) in Embodiment 1.

Figure 9:
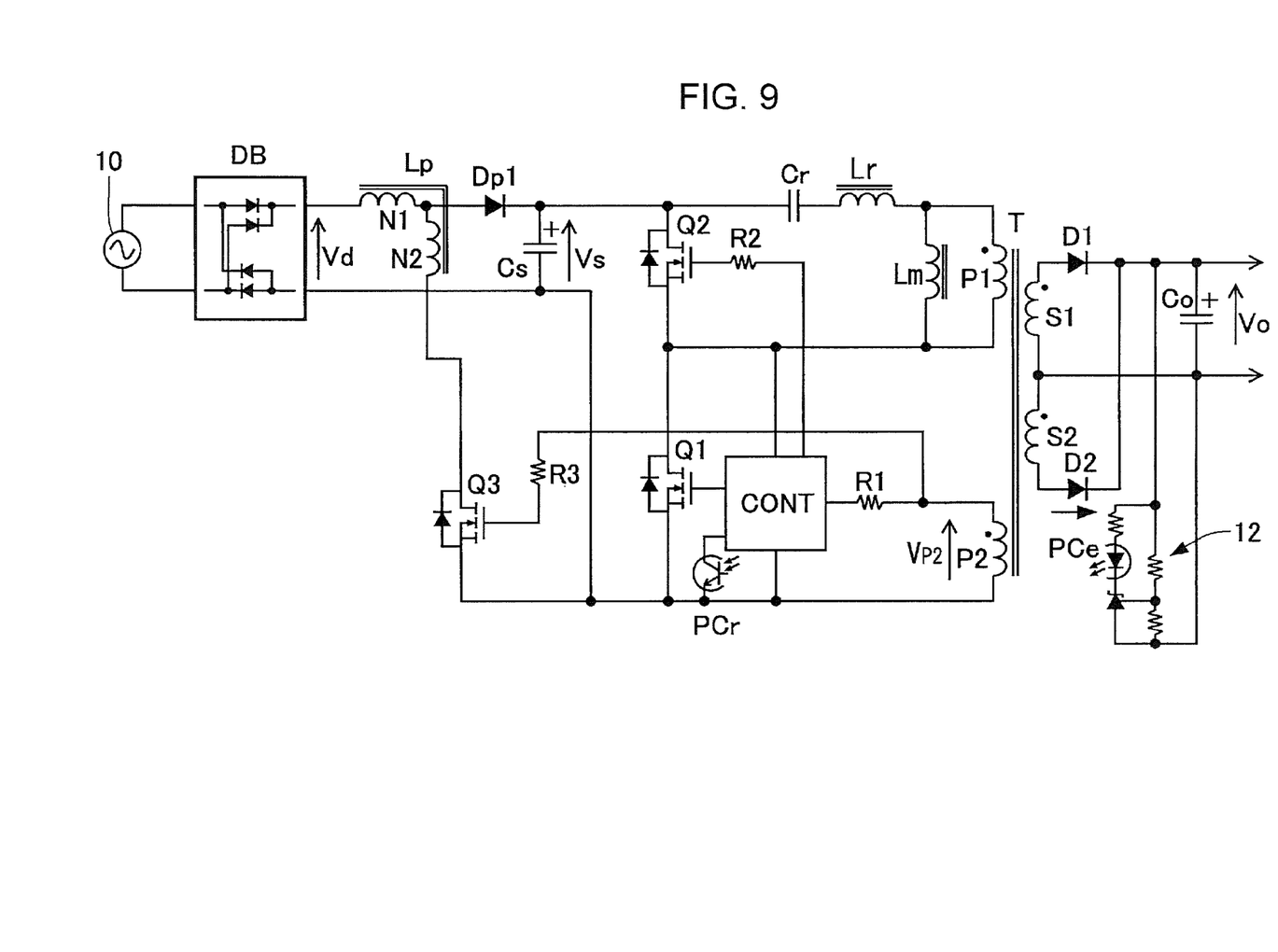
FIG. 9 is a circuit diagram showing a power factor correct current resonance converter according to Embodiment 6.

FIG. 9 is a circuit diagram showing a power factor correct current resonance converter according to Embodiment 6. In FIG. 9, components identical to or equivalent to the components shown in FIG. 8 are designated with the same reference numerals and signs, and detailed description thereof is omitted.

According to the power factor correct current resonance converter according to Embodiment 6, a connection method of a choke coil Lp having two windings N1 and N2 is changed from that in Embodiment 5.

Specifically, a connection point of the winding N1 and the winding N2 of the choke coil Lp is connected to an anode of a diode Dp1, and a free end side of the winding N2 is connected to a third switch Q3. In this case, a voltage Vs produced in a smoothing capacitor Cs is represented as in an expression (6) and an expression (7):

$$Vs=Vd\{1-(1-n)D\}/(1-D) \quad (6)$$

$$n=N1/(N1+N2) \quad (7)$$

Assuming that N1=N2 and the time ratio D=0.5 by way of example, n in the expression (7) is equal to 0.5, the voltage Vs in the expression (6) is equal to 1.5 Vd, and the step-up ratio is lower than that of the expression (3) in Embodiment 1.

Figure 10:
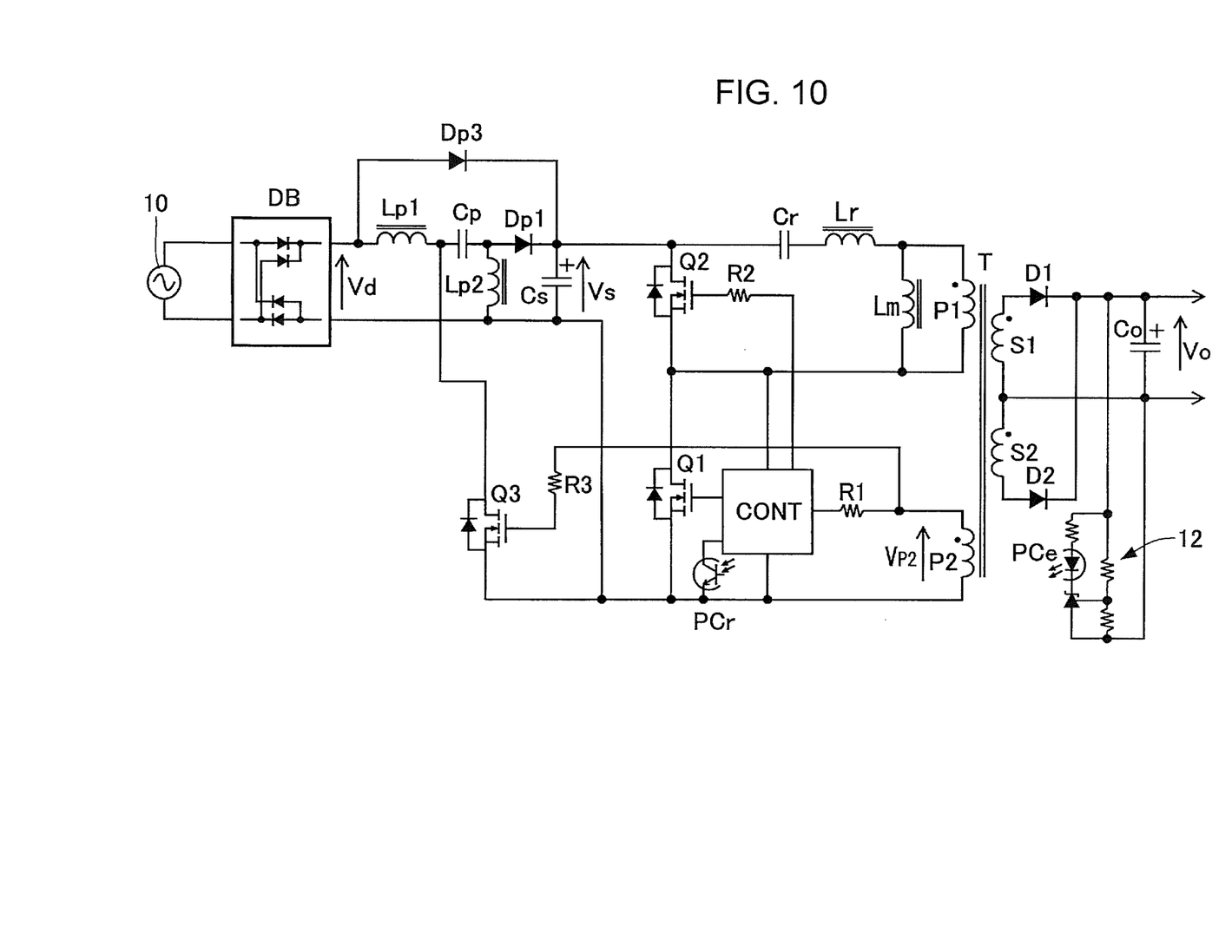
FIG. 10 is a circuit diagram showing a power factor correct current resonance converter according to Embodiment 7.

FIG. 10 is a circuit diagram showing a power factor correct current resonance converter according to Embodiment 7. In FIG. 10, components identical to or equivalent to the components shown in FIG. 1 are designated with the same reference numerals and signs, and detailed description thereof is omitted.

The power factor correct current resonance converter according to Embodiment 7 has a configuration in which the power factor correct converter circuit in each of Embodiments 1 to 6 is replaced by an SEPIC (Single Ended Primary Inductance Converter). In contrast to the power factor correct converter in each of Embodiments 1 to 6 that is the step-up boost converter, the SEPIC converter includes a capacitor and an inductor in the middle of the boost converter to change an output voltage range, thereby allowing a voltage drop as well.

The SEPIC converter employs two choke coils Lp1 and Lp2. The choke coil Lp1 has one end which receives a voltage Vd rectified by a diode bridge DB and the other end connected to one end of an energy transfer capacitor Cp. A connection point of the choke coil Lp1 and the energy transfer capacitor Cp is connected to a switch Q3. The other end of the energy transfer capacitor Cp is connected to an anode terminal of a diode Dp1. A cathode terminal of the diode Dp1 is connected to a positive pole terminal of a smoothing capacitor Cs. A connection point of the energy transfer capacitor Cp and the diode Dp1 is connected to one end of the choke coil Lp2, and the other end of the choke coil Lp2 is connected to a negative pole terminal of the smoothing capacitor Cs. The two choke coils Lp1 and Lp2 are independent of each other and are not magnetically coupled. A diode Dp3 is provided for supplying a current to the smoothing capacitor Cs at start-up of the SEPIC converter to establish a voltage Vs, and is connected in parallel to a series circuit of the choke coil Lp1, the diode Dp1, and the energy transfer capacitor Cp, and a cathode terminal of the diode Dp3 is connected to the positive pole of the smoothing capacitor Cs.

Since the output/input voltage ratio of the SEPIC converter is proportional to the ratio of the on-time to the off-time of the switch Q3, the output voltage of the power factor correct converter circuit can be set to be lower than that of the boost converter.

Figure 11:
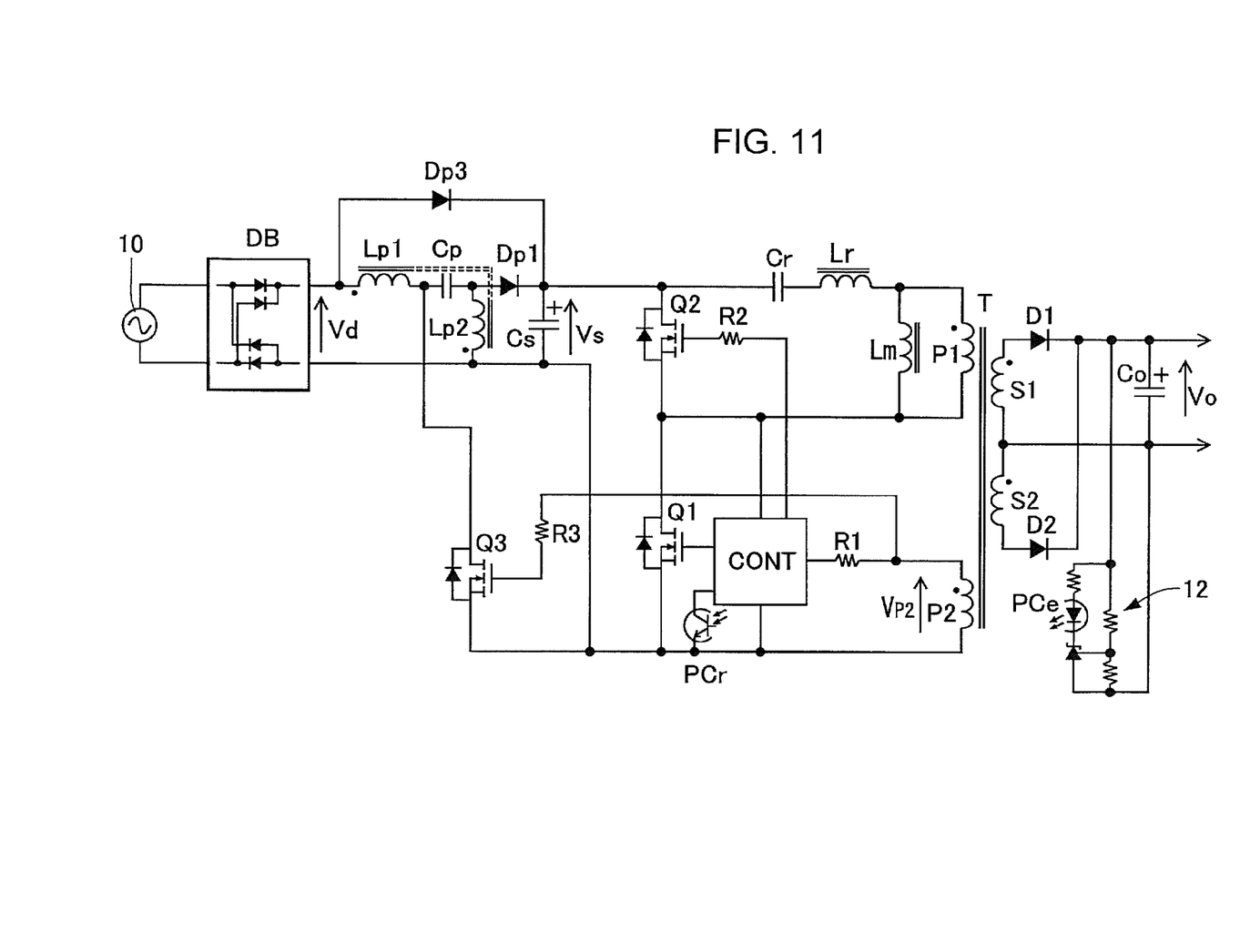
FIG. 11 is a circuit diagram showing a power factor correct current resonance converter according to Embodiment 8.

FIG. 11 is a circuit diagram showing a power factor correct current resonance converter according to Embodiment 8. In FIG. 11, components identical to or equivalent to the components shown in FIG. 10 are designated with the same reference numerals and signs, and detailed description thereof is omitted.

In the power factor correct current resonance converter according to Embodiment 8, the two choke coils Lp1 and Lp2 in Embodiment 7 are wound on a single core to be magnetically coupled to each other, and integrally formed into one element. In FIG. 11, dots shown at the choke coils Lp1 and Lp2 represent the polarity.

Figure 12:
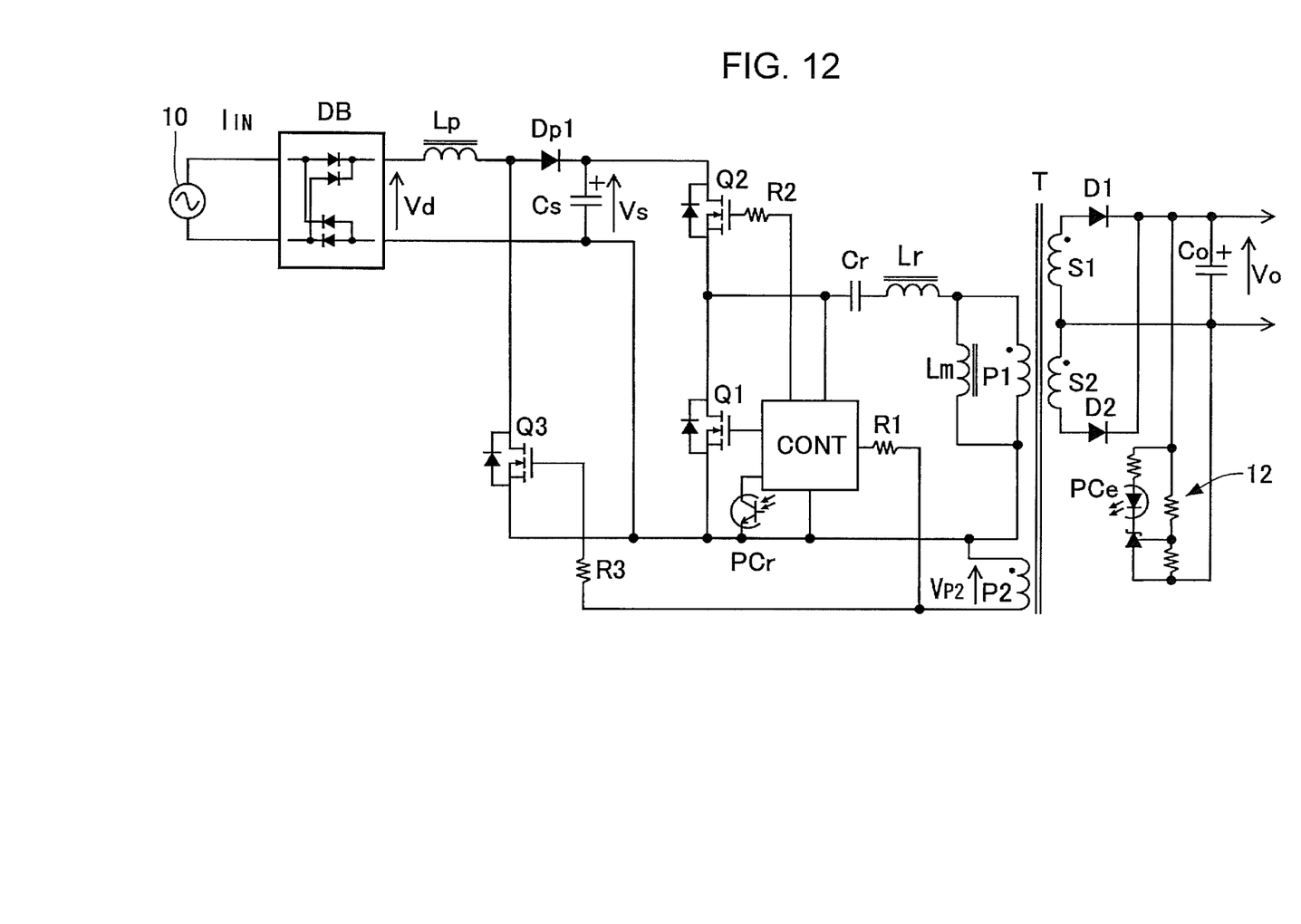
FIG. 12 is a circuit diagram showing a power factor correct current resonance converter according to Embodiment 9.

FIG. 12 is a circuit diagram showing a power factor correct current resonance converter according to Embodiment 9. In FIG. 12, components identical to or equivalent to the components shown in FIG. 1 are designated with the same reference numerals and signs, and detailed description thereof is omitted.

In the power factor correct current resonance converter according to Embodiment 9, the connection position of the series circuit of the resonance capacitor Cr, the resonance inductor Lr, and the winding P1 on the primary side of the transformer T is changed as compared with the power factor correct current resonance converter according to each of Embodiments 1 to 8.

Specifically, in the power factor correct current resonance converter according to each of Embodiments 1 to 8, the series circuit of the resonance capacitor Cr, the resonance inductor Lr, and the winding P1 on the primary side of the transformer T is connected in parallel to the switch Q2 on the upper side. In contrast, in the power factor correct current resonance converter according to Embodiment 9, the series circuit of the resonance capacitor Cr, the resonance inductor Lr, and the winding P1 on the primary side of the transformer T is connected in parallel to a switch Q1 on a lower side. In addition, a second winding P2 provided on the primary side of the transformer T supplies a voltage VP2 of inverse polarity to a control circuit CONT and a third switch Q3. The remaining configuration is not different from that in Embodiment 1. Since this causes the power factor correct converter circuit to be turned on or off in synchronization with turn-on or turn-off of the switch Q1 in a current resonance converter circuit, the power factor correct current resonance converter performs the same operation as that of the power factor correct current resonance converter according to Embodiment 1.

While the description has been made in the case where the resonance capacitor Cr, the resonance inductor Lr, and the winding P1 on the primary side of the transformer T are connected in series in this order to form the series circuit, the invention is not limited thereto. Specifically, the resonance capacitor Cr, the resonance inductor Lr, and the winding P1 on the primary side of the transformer T may be connected in an arbitrary order, and the series circuit portion of the resonance inductor Lr and the winding P1 on the primary side of the transformer T may be formed only of the winding P1.

What is claimed is:

1. A power factor correct current resonance converter comprising:
    a current resonance converter circuit having a switch and having a transformer with primary and secondary windings, the transformer additionally having a further winding that is not electrically connected to the primary or secondary windings; and
    a power factor correct converter circuit that is cascade-connected to the current resonance converter circuit and that is additionally connected to the further winding, the power factor correct converter circuit having another switch,
    wherein switching operation of the switch of the power factor correct converter circuit is performed in synchronization with switching operation of the switch of the current resonance converter circuit.

2. The power factor correct current resonance converter according to claim 1,
    wherein the switch of the current resonance converter circuit is a first switch,
    wherein the current resonance converter circuit further includes:
        a second switch connected in series with the first switch;
        a resonance circuit connected to one of the first and second switches, the resonance circuit including a resonance capacitor and a resonance inductor;
        a transformer connected to the resonance circuit, the transformer having a first winding provided on a primary side and a second winding, a voltage being produced in the second winding in response to turn-on/turn-off of the first switch and the second switch, and the transformer additionally having a winding on a secondary side;

a rectifying/smoothing circuit connected to the winding on the secondary side of the transformer; and a control circuit turning on or off the first switch based on the voltage produced in the second winding, wherein the switch of the power factor correct converter circuit is a third switch, wherein the power factor correct converter circuit further includes a choke coil having one end receiving a voltage provided by rectifying a commercial alternating-current input power source, a diode connected to the other end of the choke coil, and a smoothing capacitor smoothing a current passing through the diode, wherein the third switch switchably connects a connection point of the choke coil and the diode to a low potential side of the smoothing capacitor, and wherein the third switch is turned on or off in response to the voltage produced in the second winding of the transformer.

3. The power factor correct current resonance converter according to claim 2, wherein the second switch is driven by the control circuit such that the second switch and the first switch are alternately turned on and off.

4. The power factor correct current resonance converter according to claim 2, wherein the choke coil has a winding provided with a tap, and the diode and the third switch are separately and respectively connected to the tap or an end portion on an opposite side to a side receiving the voltage provided by rectifying the commercial alternating-current input power source to allow a change in a step-up ratio of the power factor correct converter circuit.

5. The power factor correct current resonance converter according to claim 2, wherein the power factor correct converter circuit further includes an energy transfer capacitor and another choke coil between the choke coil and the diode to provide an SEPIC converter.

6. A power factor correct current resonance converter comprising:

a current resonance converter circuit having a switch; and a power factor correct converter circuit cascade-connected in a previous stage of the current resonance converter circuit, the power factor correct converter circuit having another switch, wherein switching operation of the switch of the power factor correct converter circuit is performed in synchronization with switching operation of the switch of the current resonance converter circuit, wherein the switch of the current resonance converter circuit is a first switch, wherein the current resonance converter circuit further includes:

a second switch connected in series with the first switch;

a resonance circuit connected to one of the first and second switches, the resonance circuit including a resonance capacitor and a resonance inductor;

a transformer connected to the resonance circuit, the transformer having a first winding provided on a primary side and a second winding, a voltage being produced in the second winding in response to turn-on/turn-off of the first switch and the second switch, and the transformer additionally having a winding on a secondary side;

a rectifying/smoothing circuit connected to the winding on the secondary side of the transformer; and a control circuit turning on or off the first switch based on the voltage produced in the second winding, wherein the switch of the power factor correct converter circuit is the second switch, wherein the power factor correct converter circuit further includes a choke coil having one end receiving a voltage provided by rectifying a commercial alternating-current input power source, a diode connected to the other end of the choke coil, and a smoothing capacitor smoothing a current passing through the diode, wherein a connection point of the choke coil and the diode is connected via a backflow preventing diode to a connection point of the first switch and the second switch, and wherein the second switch is turned on or off in response to the voltage produced in the second winding of the transformer.

7. A power factor correct current resonance converter comprising:

a current resonance converter circuit having a switch; and a power factor correct converter circuit cascade-connected in a previous stage of the current resonance converter circuit, the power factor correct converter circuit having another switch, wherein switching operation of the switch of the power factor correct converter circuit is performed in synchronization with switching operation of the switch of the current resonance converter circuit, wherein the switch of the current resonance converter circuit is a first switch, wherein the current resonance converter circuit further includes:

a second switch connected in series with the first switch;

a resonance circuit connected to one of the first and second switches, the resonance circuit including a resonance capacitor and a resonance inductor;

a transformer connected to the resonance circuit, the transformer having a first winding provided on a primary side and a second winding, a voltage being produced in the second winding in response to turn-on/turn-off of the first switch and the second switch, and the transformer additionally having a winding on a secondary side;

a rectifying/smoothing circuit connected to the winding on the secondary side of the transformer; and a control circuit turning on or off the first switch based on the voltage produced in the second winding, wherein the switch of the power factor correct converter circuit is a third switch, wherein the power factor correct converter circuit further includes a choke coil having one end receiving a voltage provided by rectifying a commercial alternating-current input power source, a diode connected to the other end of the choke coil, and a smoothing capacitor smoothing a current passing through the diode, wherein the third switch switchably connects a connection point of the choke coil and the diode to a low potential side of the smoothing capacitor, wherein the third switch is turned on or off in response to the voltage produced in the second winding of the transformer, and wherein the transformer has a third winding on its primary side, and the second switch is turned on or off in response to a voltage produced in the third winding.

* * * * *